United States Patent [19]

Mackay

[11] Patent Number: 5,502,687
[45] Date of Patent: Mar. 26, 1996

[54] METHOD FOR DATUMIZING SEISMIC DATA BY FORWARD MODELING

[75] Inventor: Scott W. Mackay, Englewood, Colo.

[73] Assignee: Western Atlas International, Inc., Houston, Tex.

[21] Appl. No.: 86,166

[22] Filed: Jul. 1, 1993

[51] Int. Cl.⁶ .................................................. G01V 1/36
[52] U.S. Cl. .................. 367/54; 367/36; 364/421
[58] Field of Search ..................... 367/36, 54; 364/421

[56] References Cited

U.S. PATENT DOCUMENTS 4,887,244  12/1989  Willis et al. ............................... 367/73

FOREIGN PATENT DOCUMENTS 632293  1/1995  European Pat. Off. .

OTHER PUBLICATIONS

Lynn et al, 22nd Annu. SPE et al. Offshore Technol. Corp. May 7, 1990, Proc. V2, pp. 585–590; abst. only herewith.
Beasley et al., 59th Annu. Soc. Explor. Geophys. Int. Mtg., Oct. 29, 1989, V–2, pp. 1179–1183; abst only herewith.
Beasley et al., 80th A Seg et al. Conf., Feb. 17, 1991. Explor. Geophys. vol. 22, #1, pp. 35–40 (Mar. 1991); Abst. Only herewith.
Yilmaz et al, Geophysics, vol. 51, #7, Jul. 1986, pp. 1355–1369.
Berryhill, J. R.; Geophysics, vol. 51, #8, Aug. 1986, pp. 1572–1579.
Yilmaz, O.; Seismic Data Processing, SEG, ISBN 0-931830-41-9, pp. 326–327.
Faye et al.; 57 Annual Seg Conv. New Orleans, LA, S. 31, pp. 450–453; 1987.

*Primary Examiner*—Nelson Moskowitz
*Attorney, Agent, or Firm*—William A. Knox

[57] ABSTRACT

Disclosed is a method for processing geophysical data that have been gathered over irregular topography. According to the method, a datum is established that lies above the highest topographic peak. The data are time-shifted from the surface to the datum using a replacement velocity that is an extrapolation of the underlying formation velocity. The wavefields beneath the surface are forwardly modeled using a modeling velocity substantially equal to zero. Between the surface and the datum, the wavefields are upwardly modeled using the replacement velocity.

15 Claims, 4 Drawing Sheets

METHOD FOR DATUMIZING SEISMIC DATA BY FORWARD MODELING

BACKGROUND OF THE INVENTION

1. Field of the Invention

This invention solves a problem involving processing of seismic data that originate from transducers emplaced on an irregular surface. In a related problem, the transducers are positioned on a flat surface, but beneath the surface, there exists a velocity interface having substantial topographic relief and a concomitant significant velocity contrast.

2. Discussion of Related Art

Ordinarily, geophysical exploration of large areas is most readily conducted by emplacing the physical-measurement instrumentation on the surface of the earth. In some land areas, such as the Front Range of the Rocky Mountains, the topographic relief is a bit irregular. In other land areas, such as the Alberta syncline, the surface may be flat prairie but the underlying Paleozoic surface is severely eroded. Devonian reefs form a disconformity with respect to the underlying Silurian formation. At sea, the surface is usually flat but the sea floor may be topographically rugged with a substantial velocity contrast across the water/formation boundary.

Unless properly corrected, the raw geophysical measurements are distorted by the irregular topography of the earth at the surface or by raypath bending that occurs at the formation interfaces subsurface. That is, the quantitative geophysical measurements tend to display the approximate topography of the irregular interface instead of the desired topography of the underlying target formation.

By way of example but not by way of limitation, this disclosure will be narrated in terms of seismic exploration geophysics but the basic concepts apply equally well to other geophysical studies such as potential field or electromagnetic measurements.

As is well known in seismic surveying a plurality of transducers are distributed over the surface of an area under study. A separate source or a certain transducer is selected as a source for generating an acoustic wavefield while the remaining transducers serve as receivers of the acoustic waves after reflection from subsurface formations. The traveltime from the source to each of the respective receivers, corrected for non-vertical raypaths and multiplied by half the average earth velocity, is a measure of the distance between the receiver and the reflecting interface. If the reflecting interface is flat and the surface is irregular, the travel time will vary in proportion to the surface elevation, producing an incorrect image.

Traditionally, to correct for surface topography, a horizontal datum is established, usually at an elevation above the tallest topographic feature. The seismic travel times are extrapolated upwards from the surface to the datum by applying a static time correction equal to the vertical distance between surface and datum divided by one-half of a preselected replacement velocity. The replacement velocity may be selected as an extension of the near-surface velocity function characteristic of the region under study. An analogous process may be implemented to correct for subsurface topography. Reduction of the seismic reflection times to a reference plane may be referred to variously as datumizing or datuming.

When a large interval exists between the surface and the datum, a strictly vertical static correction path does not fit the actual ray path geometry that would have existed if the recording surface had coincided with the datum. That discrepancy is shown in FIG. 1. In FIGS. 1 and 2, the ordinate is depth and the abscissa is transducer offset. Using the well-known exploding reflector concept as illustrative for a point diffractor, the raypaths such as 10 emerging at the recording surface 12 should be extrapolated upwards to the datum 13 along the dashed slant paths such as 14 of FIG. 1 rather than along the dashed vertical paths such as 16 as shown in FIG. 2. A pure vertical time shift as in FIG. 2 simply displaces the diffraction hyperbola 18 (FIG. 3B) bodily to a position deeper in time to 20 but lacking a corresponding flattening in the slopes (that is, a reduction in the normal moveout) of the limbs 22 and 24 as would be expected had the diffractor in fact existed at a greater depth. In FIGS. 3A and 3B, the ordinate is wavefield traveltime and the abscissa is lateral transducer location. Limb flattening is illustrated in FIG. 3A which shows hyperbola 18 from FIG. 3B and hyperbola 21 from a deeper bed with the expected reduction in normal moveout at limbs 23 and 25 due to the greater raypath lengths. Application of a wave-equation migration algorithm, applied from the datum, to the constant-time-displaced diffraction hyperbola 20 of FIG. 3B would result in over-migration.

Berryhill, in 1979, discussed the problem of wave-equation datuming in a paper entitled "Wave-equation datuming" published in *Geophysics*, v. 44, pp. 1329–1344 with a follow-up Note in 1984 entitled "Wave-equation datuming before stack" *Geophysics*, v 49, pp. 2064–2066. He provides an exact solution to the datuming problem but the main difficulty with Berryhill's method is that it is so computationally intensive as to be uneconomical.

In U.S. Pat. No. 4,943,950, issued Jul. 24, 1990, and assigned to the assignee of this invention, Beasley et al., teach a more computationally efficient method for datumizing seismic data. The '950 patent teaches a method for migrating seismic data that has been vertically static corrected. For data below a datum but above the surface elevation, a zero (or very small) migration velocity is applied. A best estimated earth velocity is used to migrate the data below the original data-recording surface.

For good and sufficient reasons, use of the Beasley et al. method is confined to the use of a finite difference migration algorithm. That algorithm is a much less accurate and less efficient method than cascaded f-k migration or any algorithm that operates in the wavenumber domain such as phase-shift migration. However, algorithms that operate in the wavenumber domain are not amenable to migration from the surface using the initial zero-velocity layer of the Beasley et al. method. That is why the finite difference algorithm is required.

There is a need for an economical and efficient datumizing method that will allow use of any desired migration algorithm for subsequent processing.

SUMMARY OF THE INVENTION

In accordance with a broad aspect of this invention, the surface-recorded data are projected upwards to a datum using a preselected replacement velocity that is assumed to characterize the space between the surface and the datum. It is assumed that a zero-velocity earth volume exists beneath the surface. A preselected modeling operator is used to extrapolate the data to the overlying datum.

The datumizing method includes the steps of selecting a desired replacement velocity and then vertically time-shifting the seismic data from a surface recording elevation to a preselected datum using the selected replacement velocity. Using a desired modeling operator, the data are then forwardly-modeled to extrapolate them to the datum using a velocity substantially equal to zero beneath the surface and using the selected replacement velocity between the recording surface and the datum. The datumized data then may be migrated using any desired migration operator.

In one aspect of this invention, the modeling operator may be a finite difference operator.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENT

Prior-art datumizing processes involved migration or downward continuation of data in the presence of a zero-velocity layer between the datum and the recording surface. The process of this disclosure on the other hand, involves forward modeling or upward continuation in the presence of a zero velocity volume beneath the recording surface. Modeling is the inverse of migration. For purposes of clearly distinguishing between the two processes, three brief tutorial paragraphs follow.

Modeling and its inverse, migration, both use the acoustic wave equation to describe the amplitude response P of a wavefield as a function of the recording-station offset X, the formation depth Z, and the elapsed travel time T. The wavefield is assumed to be traveling in a medium (e.g. a subsurface formation) characterized by an acoustic propagation velocity V. In 2-D coordinates, the wave equation is:

$$\frac{\partial^2 P}{\partial X^2} + \frac{\partial^2 P}{\partial Z^2} = \frac{1}{V^2} \frac{\partial^2 P}{\partial T^2}.$$

If the wavefield characteristics are known for any two of the three coordinates X, Z or T, its attributes can be solved for the third coordinate.

Given a source of energy radiating from a known point of origin at a depth Z, forward modeling solves for the wavefield travel-time trajectories as would be seen by an array of transducers located at incremental offsets $X_i$ from the source along an arbitrary datum at Z=0. The problem may be solved using an approach, by way of example but not by way of limitation, having the form $$f(P_{X, Z=0, T}) = \psi(Z - \Delta Z),$$

where $\Delta Z$ is a small depth step and $\psi$ is some desired wavefield operator such as, but not limited to, a finite difference operator.

Migration or downward continuation, on the other hand assumes that the travel time trajectories seen by an array of transducers located on a designated recording surface at Z=0 are known. Migration seeks to downward extrapolate the data to evaluate Z at T=0, using an algorithm of the form $$f(P_{X, Z, T=0}) = \phi(Z + \Delta Z),$$

where $\phi$ is some wavefield operator of any desired type.

Figure 4:
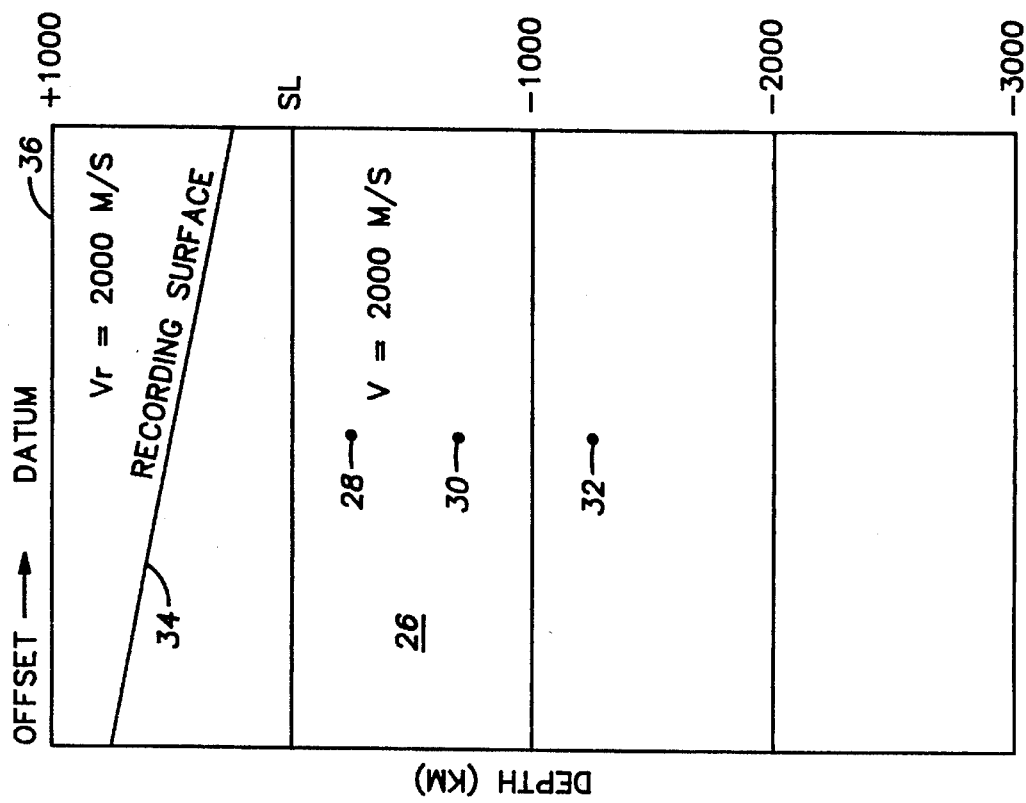
FIG. 4 is an example of a subsurface model having a sloping recording surface.

Refer now to FIG. 4 which illustrates a subsurface model 26 containing a number of point diffractors 28, 30, 32 at depths of −250, −750 and −1250 meters respectively, referred to sea level. The diffractors lie below a recording surface 34 that slopes from +750 meters On the left to +250 meters on the right end of the section. An arbitrary datum plane 36 is established at +1000 meters. The velocity function near the surface is 2000 meters per second (m/s). For purposes of this example, the replacement velocity between the recording surface and the datum is 2000 m/s which is a logical extrapolation of the subsurface formation velocity function. The vertical coordinate is, of course depth while the horizontal coordinate is lateral distance, both being measured in meters.

Figure 5:
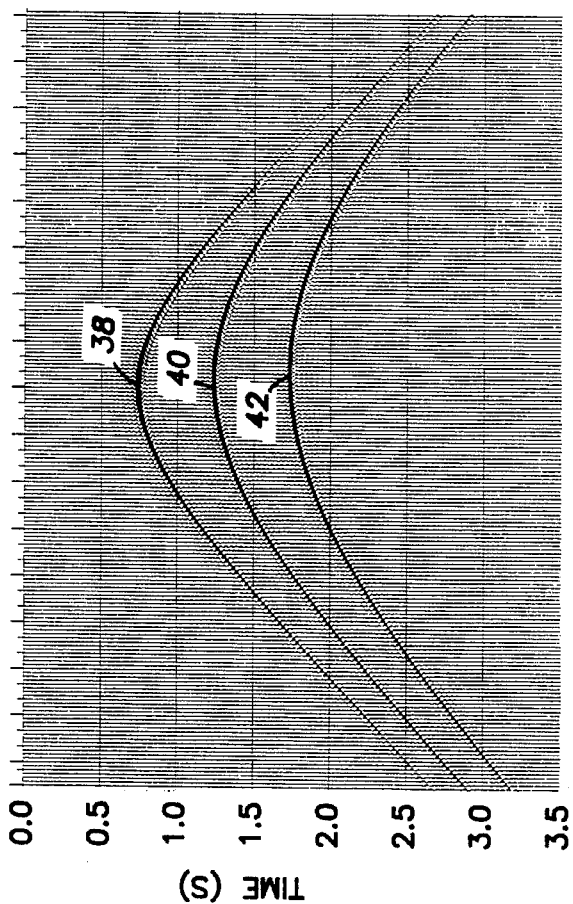
FIG. 5 shows the seismic amplitude responses to three point diffractors at an array of receivers positioned on the sloping recording surface of FIG. 4.

FIG. 5 shows the raw diffraction hyperbolae 38, 40, 42 as recorded along the sloping recording surface 34 of FIG. 4. The vertical coordinate is two-way travel time in seconds; the horizontal coordinate is lateral offset measured as a function of the separation between the respective transducers of an array. As would be expected, the left hand limbs of the hyperbolae exhibit substantially longer traveltimes by reason of the higher elevation of the recording surface.

Figure 3A:
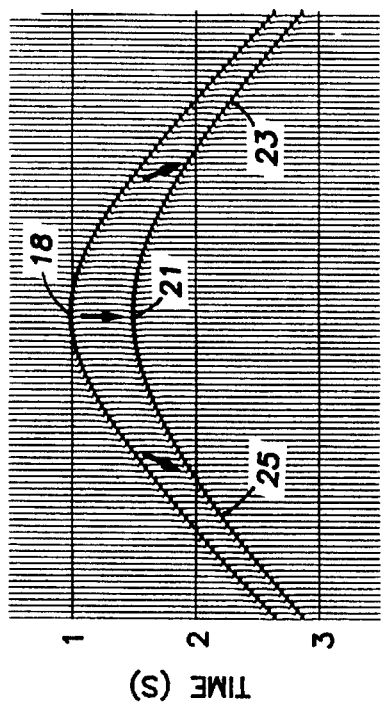
FIG. 3A illustrate the effect on a diffraction hyperbola of additional propagation effects caused by an incremental depth step.
Figure 3B:
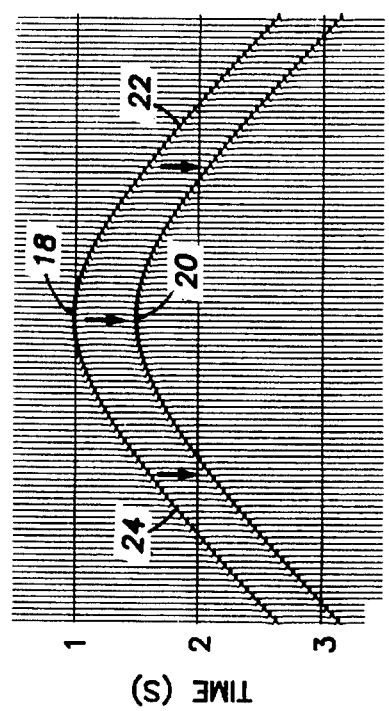
FIG. 3B illustrates the effect of a constant time shift on a diffraction hyperbola.
Figure 1:
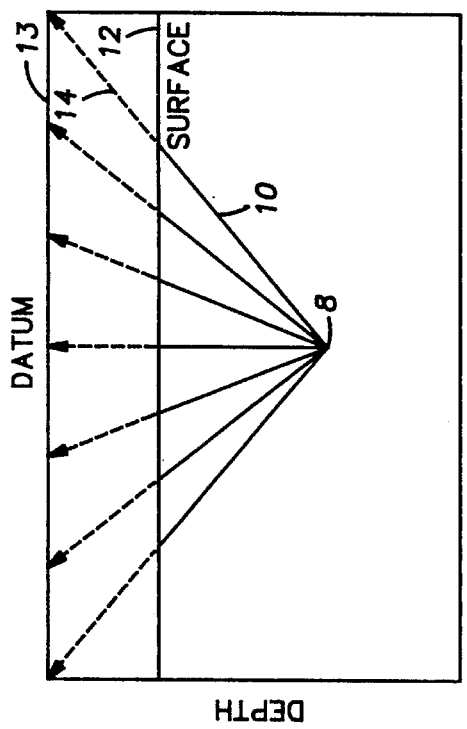
FIG. 1 shows the prior-art raypaths from an exploding diffractor extrapolated upwards to a datum using wave equation considerations.
Figure 2:
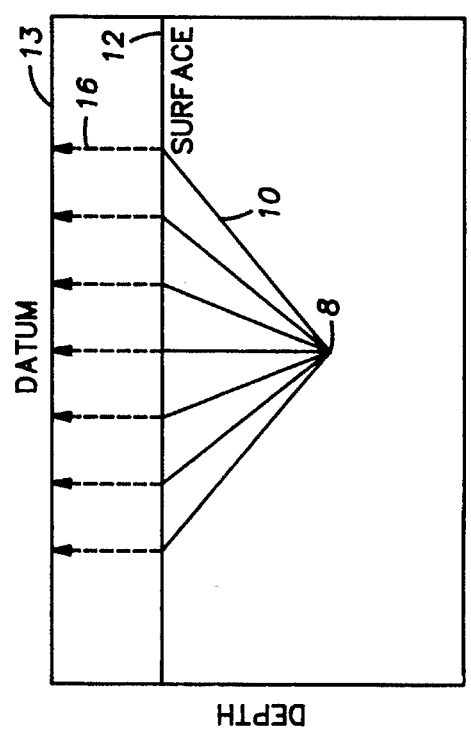
FIG. 2 shows prior-art raypaths from an exploding diffractor, bent vertically upwards from a recording surface to a datum.
Figure 6:
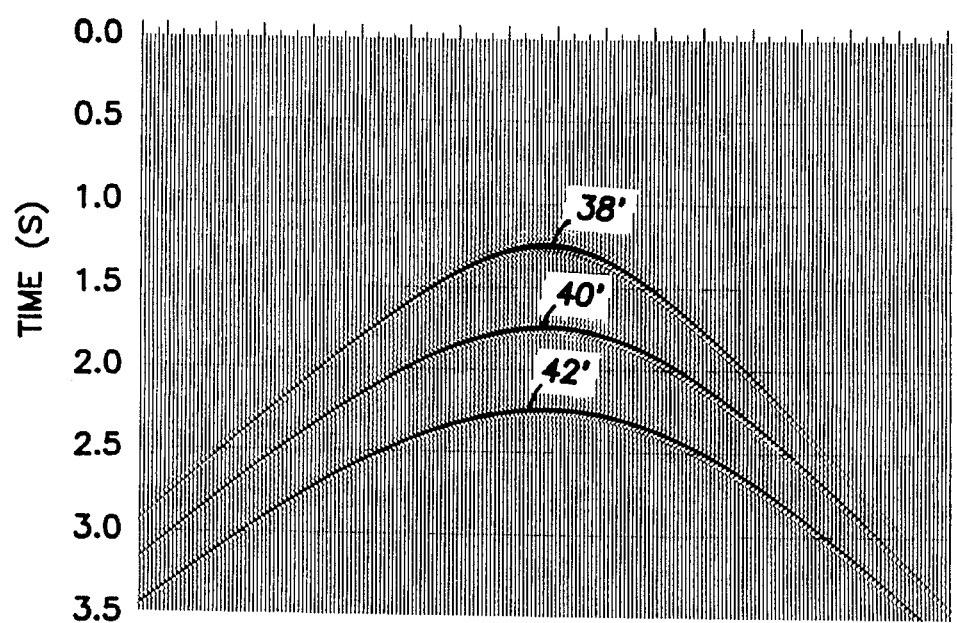
FIG. 6 displays the data of FIG. 5 extrapolated vertically upward to a datum.
Figure 7:
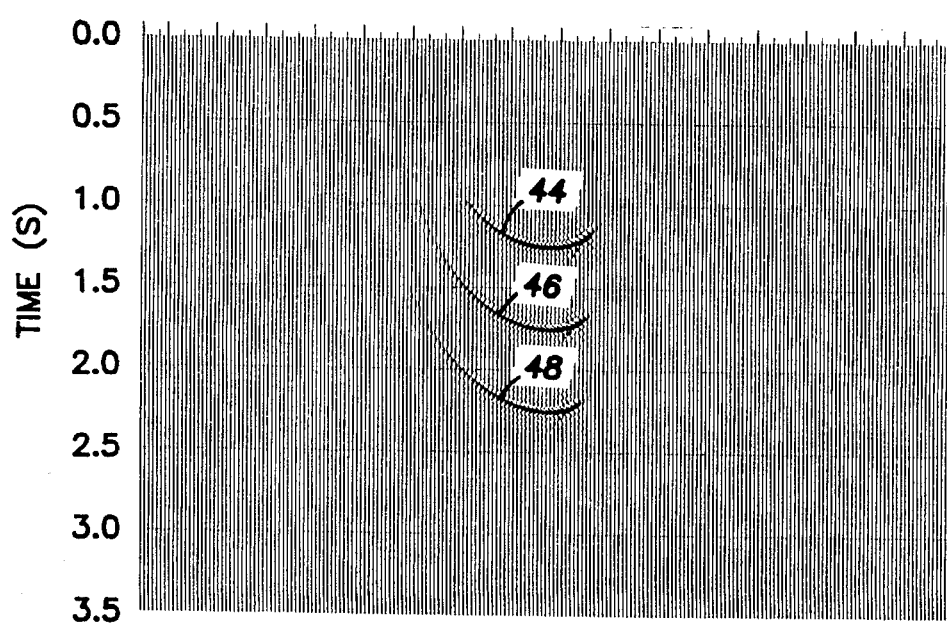
FIG. 7 is an example of f-k migration of the data of FIG. 6 with the correct velocity yet showing overmigration.

The datumizing process as shown by example here is preferably applied to stacked seismic data although it may be applied to pre-stacked data before application of DMO. It begins by applying to the travel times, the usual vertical static corrections (statics) between the surface and the datum. The statics are computed by dividing the measured vertical incremental paths, such as 16 of FIG. 2, by the selected replacement velocity of 2000 m/s. The hyperbolae 38. 30. 42 of FIG. 5, after vertical statics have been applied, are shown in FIG. 6. The apices 38', 40', 42' of the time-shifted hyperbolae have been pushed down by 0.5 second because of the 500-meter upward extrapolation to the datum above the apices. The right hand limbs of the hyperbolae appear to be slightly overbalanced to the right. The slopes of the limbs remain the same as before application of the statics. For that reason, the apparent moveout is too large for the traveltime window that embraces the diffractors. Therefore, any migration attempt at this point would clearly result in gross overmigration as shown by envelopes 44, 46, 48 in FIG. 7.

Figure 8:
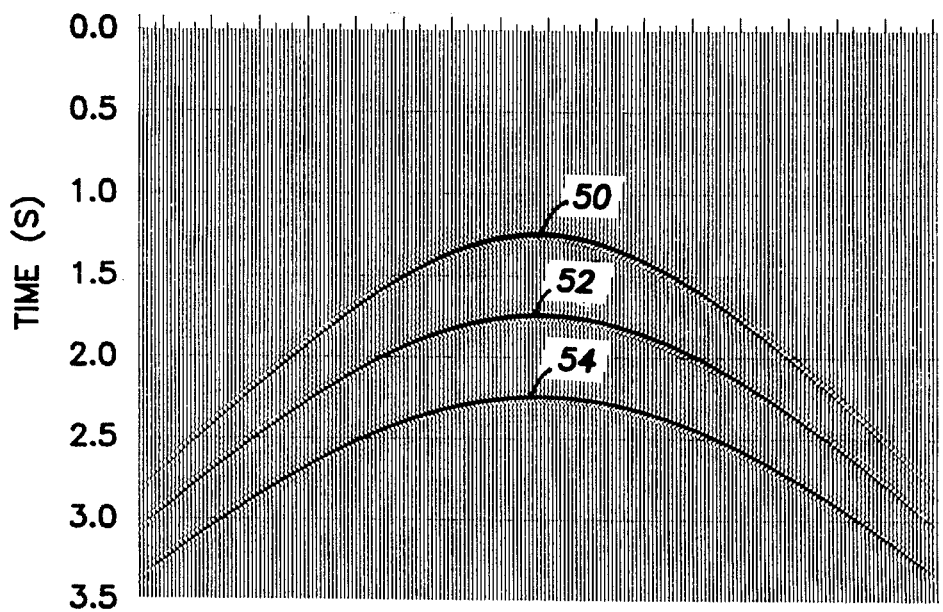
FIG. 8 illustrates the data of FIG. 5 after upward-extrapolation to the datum using forward modeling.

Overmigration can be avoided by employing the following implementation of upward wavefield modeling. The data of FIG. 6 are upwardly modeled using as the operator, by way of example but not limited thereto, the well-known finite-difference algorithm along with a modeling velocity $V_m$ that is characterized by $$V_m = \begin{vmatrix} V_r, \text{ surface-datum} \\ 0, \text{ below surface} \end{vmatrix},$$

where $V_r$ is the replacement velocity that is chosen as earlier explained. The subsurface earth formation is considered to be characterized by a propagation velocity approaching or substantially equal to zero and therefore, the data do not undergo propagation effects during processing. Above the surface but beneath the datum, use of an exemplary modeling algorithm such as finite difference algorithm with the exemplary replacement velocity $V_r$ of 2000 m/s models the arriving wavefields to be imaged, as shown in FIG. 8, by hyperbolae 50, 52, 54. The hyperbolae appear exactly as they would had they actually been received at a recording surface 34 that in fact coincided with datum 36.

Figure 9:
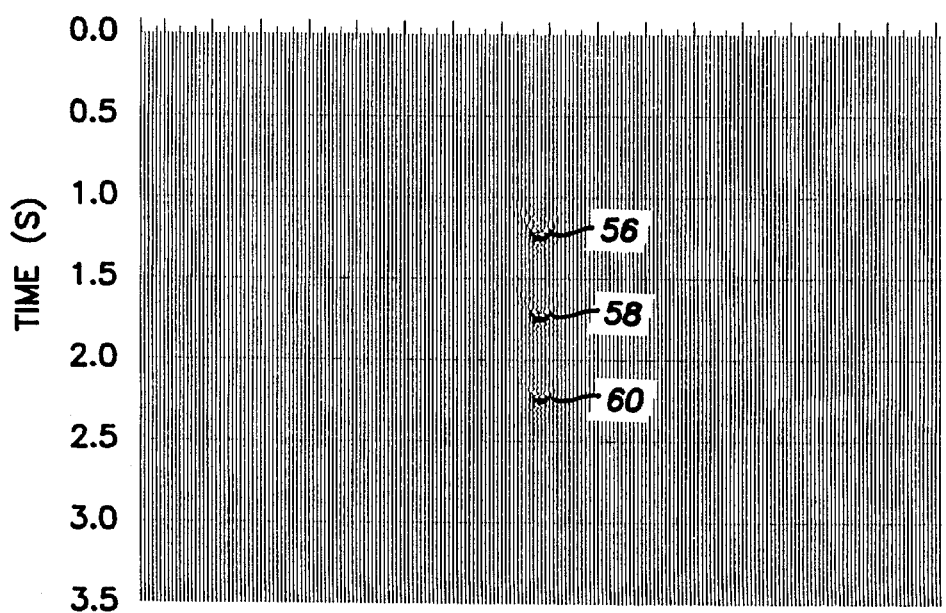
FIG. 9 represents the data of FIG. 8 after application of an exemplary migration f-k operator, showing correct migration by collapsing the diffraction hyperbolas to their apices.

FIG. 9 shows the results of migrating the data-model of FIG. 8 using the well-known frequency-wavenumber migration algorithm. Each of the diffraction hyperbolae 50, 52, 54 have been properly collapsed to point sources 56, 58, 60. The small amount of noise is due to minor limitations that are inherent in the finite-difference method that was used here for the modeling process.

The exemplary processes above cited assume that the transducers are distributed over a recording surface comprised of a competent rock formation. In actual fact, a highly irregular and very troublesome weathered layer exists on top of the formation. The velocity is quite low—on the order of 800–900 m/s. It is customary to arithmetically scrape off the effects of the low-velocity layer. That is done by subtracting out the estimated travel time through the weathered layer from the recorded wavefield travel times, in a vertical sense, at each transducer. The actual or estimated travel time through the anomalous layer is based on its characteristic velocity. The wavefield travel time, thus reduced back to the top of the competent formation, is then extrapolated to the datum in the usual manner using a replacement velocity that is an extension of the formation velocity function.

In marine operations, the water layer forms a low velocity layer over an irregular sea floor as earlier discussed. The effect of an irregular water thickness is removed by replacing the constant water velocity of 1500 m/s with a replacement velocity characteristic of the rocks beneath the water bottom. The preferred method in that case is to apply a downward-continuation algorithm using the constant water velocity down to the water bottom. The water bottom times are then vertically adjusted so as to place the water bottom depth at a vertical time consistent with the replacement velocity. The data are then extrapolated from the water bottom back up to the datum with a modeling operator incorporating the replacement velocity.

The method disclosed herein has been explained with reference to two-dimensional (2-D) exploration techniques. Many geophysical surveys involve arrays of transducer that are spatially distributed over an area rather than along a single line. The arrays may be oriented along at least two spatial coordinates such as along northerly (in-line) and easterly (cross-line) directions or in any other desired pattern. Such three-dimensional (3-D) geophysical surveys can be processed by first forward-modeling the signals from in-line arrays followed by forward-modeling the data from cross-line arrays and combining the two sets of processed data by any desired well-known method.

An efficient, economical method has been disclosed for modeling geophysical data gathered from instrumentation positioned on an irregular recording surface or affected by erratic subsurface topography. The discussion is exemplary only and in no way limiting. Variations in the method will be developed by those skilled in the art but which will fall within the scope and spirit of the disclosure which is limited only by the appended claims.

What is claimed is:

1. A method for datumizing geophysical data comprising the steps of:
    (a) time-shifting the geophysical data from a surface elevation to a datum;
    (b) forward-modeling said geophysical data beneath said surface elevation using a velocity substantially equal to zero; and
    (c) forward-modeling said geophysical data between said surface elevation and said datum using a preselected replacement velocity.

2. The method as defined by claim 1, wherein:
    the step of time shifting is accomplished by applying a time shift proportional to the vertical space existing between the surface and the datum divided by said replacement velocity.

3. The method as defined by claim 1, wherein steps (a) through (c) are performed on prestack seismic data.

4. The method as defined by claim 2, wherein steps (a) through (c) are performed on prestack seismic data.

5. A method for shifting seismic data from a first elevation to a second higher reference elevation, comprising:
    (a) selecting a preferred replacement velocity;
    (b) time-shifting said seismic data in proportion to the difference in elevation between said first and second elevations divided by said replacement velocity;
    (c) forward-modeling said time-shifted seismic data below said first elevation using a modeling velocity substantially equal to zero;
    (d) forward-modeling said time-shifted seismic data between said first and second elevations using a modeling velocity equal to said selected replacement velocity.

6. The method as defined by claim 5, wherein the elevation difference is constrained to be the vertical elevation difference.

7. The method as defined by claim 5, wherein steps (a) through (d) are performed on said seismic data prior to stacking and DMO.

8. The method as defined by claim 5, wherein steps (a) through (d) are performed on stacked seismic data.

9. The method as defined by claim 1, wherein steps (a) through (c) are performed on stacked seismic data.

10. A method for datumizing seismic wavefields received by an array of transducers that are spatially distributed in an area over a recording surface, the wavefields originating from within a subsurface rock formation, comprising:
    (a) vertically time-shifting the seismic wavefields from said recording surface to a horizontal datum;
    (b) forward-modeling said seismic wavefields in the subsurface rock formation using a modeling velocity substantially equal to zero; and
    (c) forward-modeling said seismic wavefields between said recording surface and said datum using a preselected replacement velocity.

11. The method as defined by claim 10, wherein:

the step of vertical time shifting is accomplished by applying a time shift proportional to the vertical distance, as measured at each said transducer, between said recording surface and said datum divided by said preselected replacement velocity.

12. The method as defined by claim 11, wherein:

said preselected replacement velocity is an extrapolation of the velocity function that is characteristic of said formation.

13. The method as defined by claim 12, comprising:

(d) datumizing the wavefields derived from transducers aligned along a first spatial coordinate;

(e) datumizing the wavefields aligned along at least a second spatial coordinate; and (f) combining the datumized wavefields from steps (d) and (e).

14. The method as defined by claim 13, comprising:

applying processing steps (a) through (f) to seismic wavefields after said wavefields have been stacked.

15. The method as defined by claim 13, comprising:

applying processing steps (a) through (f) to seismic wavefields prior to application of stacking.

* * * * *